United States Patent
Roohparvar et al.

(10) Patent No.: US 10,008,872 B2
(45) Date of Patent: Jun. 26, 2018

(54) METHODS OF EXTENDING THE LIFE OF BATTERY

(71) Applicant: BATTEROO, INC., San Jose, CA (US)

(72) Inventors: Fariborz Frankie Roohparvar, Monte Sereno, CA (US); Farzan Bob Roohparvar, San Jose, CA (US)

(73) Assignee: Batteroo, Inc., Sunnyvale, CA (US)

( * ) Notice: Subject to any disclaimer, the term of this patent is extended or adjusted under 35 U.S.C. 154(b) by 679 days.

(21) Appl. No.: 14/531,392

(22) Filed: Nov. 3, 2014

(65) Prior Publication Data

US 2015/0048785 A1    Feb. 19, 2015

Related U.S. Application Data

(63) Continuation-in-part of application No. 13/236,436, filed on Sep. 19, 2011.
(Continued)

(51) Int. Cl.
*H01M 14/00* (2006.01)
*H02J 7/00* (2006.01)
(Continued)

(52) U.S. Cl.
CPC ............. *H02J 7/0057* (2013.01); *H01M 2/20* (2013.01); *H01M 2/204* (2013.01); *H01M 2/30* (2013.01);
(Continued)

(58) Field of Classification Search
CPC .... H01M 10/425; H01M 10/46; H01M 10/42; H01M 10/44; H01M 6/50; H01M 2/20;
(Continued)

(56) References Cited

U.S. PATENT DOCUMENTS 4,702,975 A   10/1987 Fields
5,229,220 A    7/1993 Stanton et al.
(Continued)

FOREIGN PATENT DOCUMENTS

CN    1242109 A    1/2000
CN    1303524 A    7/2001
(Continued)

OTHER PUBLICATIONS

PCT/US2011/052209, International Search Report and Written Opinion, dated Apr. 23, 2012, 8 pages.
(Continued)

*Primary Examiner* — Raymond Alejandro
(74) *Attorney, Agent, or Firm* — Kilpatrick Townsend & Stockton LLP

(57) ABSTRACT

Methods for extending the life of a battery output regulated voltages from output terminals configured to interface with input terminals of battery powered devices. A method includes receiving a battery electrical power output from the battery. The voltage output by the battery decreases from a battery first output voltage to a battery second output voltage during use of the battery. The electrical power output is used to drive a converter that outputs a converter electrical power having a converter output voltage greater than the battery second output voltage. The converter electrical power is output from output terminals configured to interface with input terminals of a battery powered device. The converter is configured and supported relative to the battery to interface with one or more output terminals of the battery.

4 Claims, 17 Drawing Sheets

US 10,008,872 B2
Page 2

Related U.S. Application Data

(60) Provisional application No. 61/962,131, filed on Nov. 1, 2013, provisional application No. 61/403,625, filed on Sep. 20, 2010.

(51) Int. Cl.
*H01M 10/42* (2006.01)
*H01M 6/50* (2006.01)
*H01M 2/20* (2006.01)
*H01M 2/30* (2006.01)

(52) U.S. Cl.
CPC .......... *H01M 6/50* (2013.01); *H01M 10/425* (2013.01); *H01M 2010/4271* (2013.01)

(58) Field of Classification Search
CPC .................. H01M 2/204; H01M 2/30; H01M 2010/4271; H02J 7/0057
See application file for complete search history.

(56) References Cited

U.S. PATENT DOCUMENTS

| | | | |
|---|---|---|---|
| 5,489,484 A | 2/1996 | Wheeler et al. | |
| 5,489,485 A | 2/1996 | Peot et al. | |
| 6,118,248 A | 9/2000 | Garstein et al. | |
| 6,205,034 B1 | 3/2001 | Zayatz | |
| 6,232,749 B1 | 5/2001 | Hewes et al. | |
| 6,238,818 B1 | 5/2001 | Dalton | |
| 6,654,228 B1 | 11/2003 | Baily | |
| 6,835,491 B2 * | 12/2004 | Gartstein ............ | H01M 6/5044 320/132 |
| 6,855,441 B1 | 2/2005 | Levanon | |
| 7,365,952 B2 * | 4/2008 | Sato ...................... | H02J 7/0031 320/106 |
| 7,633,261 B2 | 12/2009 | Baron et al. | |
| 7,932,700 B2 | 4/2011 | Cintra et al. | |
| 8,410,757 B2 * | 4/2013 | Tsukamoto .......... | G01R 31/362 320/118 |
| 8,865,338 B2 * | 10/2014 | Sugawara ............ | H01M 2/1077 429/159 |
| 2004/0067740 A1 | 4/2004 | Handa et al. | |
| 2004/0164706 A1 | 8/2004 | Osborne | |
| 2005/0175889 A1 | 8/2005 | Han | |
| 2006/0152190 A1 | 7/2006 | Riemschneider | |
| 2007/0275299 A1 | 11/2007 | Larsen | |
| 2008/0136367 A1 | 6/2008 | Adest et al. | |
| 2008/0160392 A1 | 7/2008 | Toya et al. | |
| 2008/0238368 A1 | 10/2008 | Baron et al. | |
| 2010/0136374 A1 | 6/2010 | Jang et al. | |
| 2011/0163712 A1 | 7/2011 | Chen | |
| 2012/0121943 A1 | 5/2012 | Roohparvar | |
| 2015/0056476 A1 | 2/2015 | Roohparvar et al. | |
| 2015/0072181 A1 | 3/2015 | Roohparvar | |

FOREIGN PATENT DOCUMENTS

| | | |
|---|---|---|
| CN | 1300452 A | 5/2002 |
| CN | 1244179 | 3/2006 |
| CN | 100376047 C | 3/2008 |
| CN | 201117696 Y | 9/2008 |
| CN | 101454924 | 8/2011 |
| EP | 1191830 A | 3/2002 |
| JP | 07192770 | 7/1995 |
| JP | 07-211301 A | 8/1995 |
| JP | 08213057 | 8/1996 |
| JP | 2002510853 | 4/2002 |
| JP | 2002510855 | 4/2002 |
| JP | 2002-151029 A | 5/2002 |
| JP | 2002330548 | 11/2002 |
| JP | 2003-047238 A | 2/2003 |
| JP | 2003047238 | 2/2003 |
| JP | 2003-518725 A | 6/2003 |
| JP | 2003518725 | 6/2003 |
| JP | 2003-284250 A | 10/2003 |
| JP | 2003284250 | 10/2003 |
| JP | 2005520313 | 7/2005 |
| JP | 2006059902 | 3/2006 |
| JP | 3131477 | 5/2007 |
| JP | 2007515149 | 6/2007 |
| JP | 2007194116 | 8/2007 |
| JP | 2008-235022 A | 10/2008 |
| JP | 2008-243818 A | 10/2008 |
| JP | 2008235022 | 10/2008 |
| JP | 2008243818 | 10/2008 |
| JP | 2010522963 | 7/2010 |
| KR | 100306734 B1 | 11/2001 |
| TW | M385097 | 7/2010 |
| WO | 9952168 | 4/1999 |
| WO | 9952163 | 10/1999 |
| WO | 2005060023 | 6/2005 |
| WO | WO2005060023 A2 | 2/2006 |
| WO | 2008118477 | 10/2008 |
| WO | WO2008118477 A1 | 10/2008 |
| WO | 2012040123 | 3/2012 |
| WO | 2017173363 | 10/2017 |

OTHER PUBLICATIONS

"Ultra Low Power Boost Converter with Battery Management for Energy Harvester Applications," Product information Texas Instrument Incorporated, 25 pages, (Oct. 2011, revised Sep. 2012).

"TPS61291 200mA boost converter with bypass mode," Product information Texas Instrument Incorporated, one page (no date).

Texas Instrument Incorporated, booster convertor product comparison table, one page (no date).

Bodhi Labs product information, http://www.bodhilabs.com/index.html, two pages (no date).

Gomadic Corp. product information, http://www.gomadic.com/battery-backup-cat.html, one page (copyright 2000-2014).

China Intellectual Property Office (SiIPO) Office Action for application CN201180049932.X (dated Dec. 31, 2014).

International Search Report and Written Opinion dated Jan. 29, 2015 for PCT/US2014/63715, 12 pages.

Johns "Fully integrated TPS6300x buck-boost converter extends Li-ion battery life," Texas Instruments Incorporated, Analog Applications Journal, pp. 15-18 (Oct. 21, 2006).

Constantin "AN1337: Optimizing Battery Life in DC Boost Converters Using MCP1640," Microchip Technology Inc. (Aug. 4, 2010), 23 pages.

"Buck-Boost Converters Help Extend Battery Life for Motion Detection," Digi-Key Corporation (Apr. 9, 2013), 4 pages.

European Search Report for application EP11827314.3 dated Jul. 6, 2015, 8 pages.

U.S. Appl. No. 14/542,313, Final Office Action dated Jun. 19, 2015, 11 pages.

European Patent Application No. EP14857962.6 , "Extended European Search Report", dated Jul. 4, 2017, 10 pages.

Johns , "Fully integrated TPS6300x buck-boost converter extenas LI-ton battery life", Texas Instruments Incorporated. Analog Applications Journal Available Online at:—http://www.ti.comjlitjanjslyt256/slyt256.pdf, Oct. 21, 2006, pp. 15-18.

International Patent Application No. PCT/US2017/025542 , "International Search Report and Written Opinion", dated Jul. 26, 2017, 14 pages.

Japan Patent Office office actions JPO patent application JP2013-529396 (dated Aug. 18, 2015).

Chinese Patent Application No. 201480071671.5, "Office Action", dated Apr. 4, 2018, 20 pages.

* cited by examiner

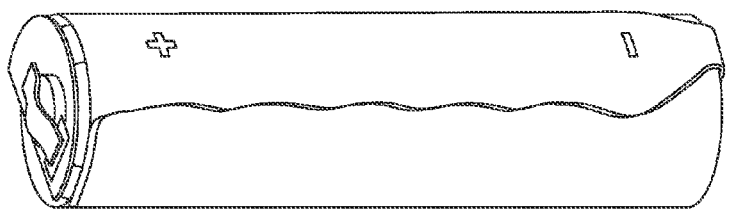
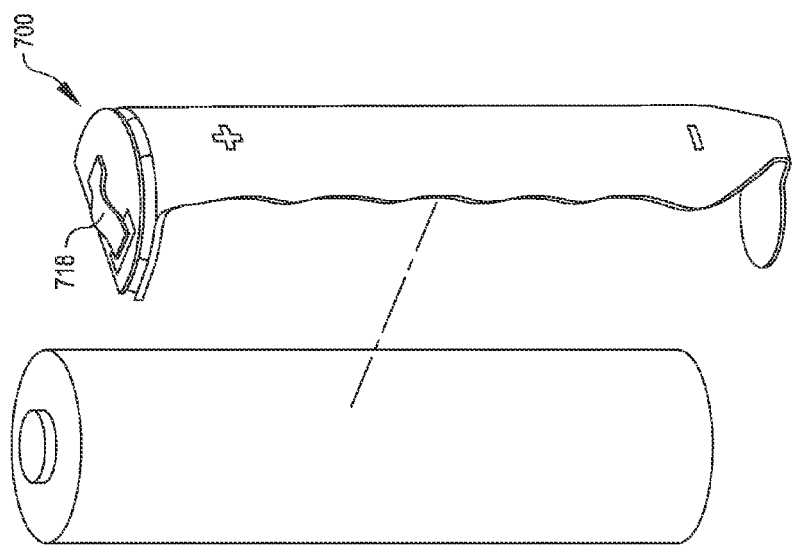
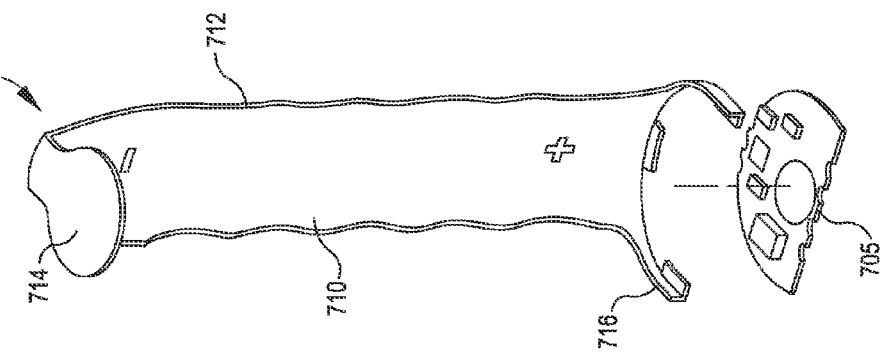

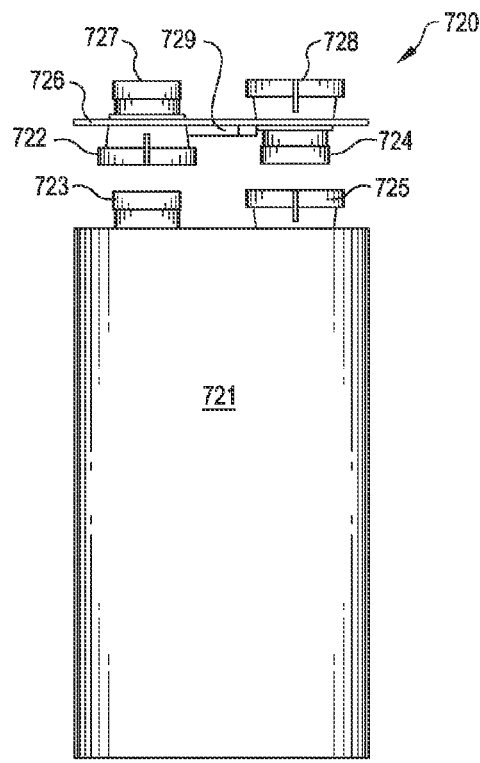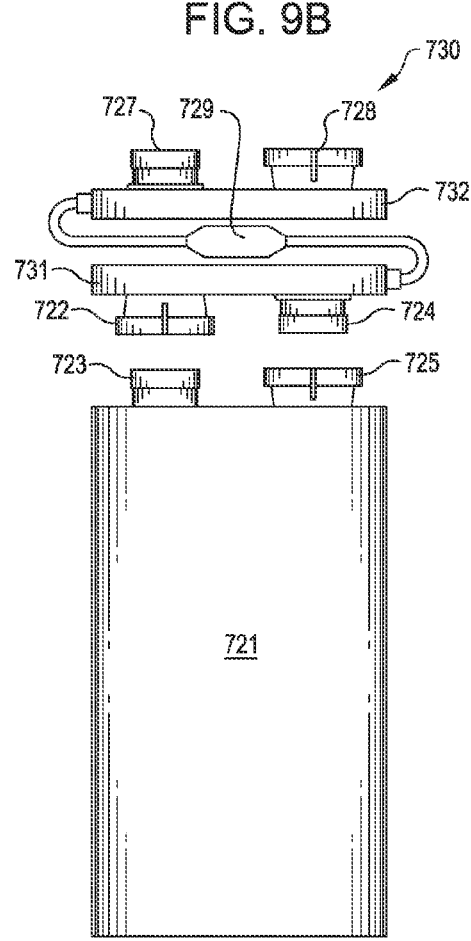

METHODS OF EXTENDING THE LIFE OF BATTERY

CROSS-REFERENCES TO RELATED APPLICATIONS

The present application claims the benefit of U.S. Provisional Application No. 61/962,131, filed Nov. 1, 2013, and is a Continuation-in-Part of U.S. application Ser. No. 13/236,436, filed Sep. 19, 2011, which application claims the benefit of U.S. Provisional Application No. 61/403,625, filed Sep. 20, 2010, the full disclosures of which are incorporated herein in their entirety by reference.

BACKGROUND

The invention relates in general to battery technology and more particularly to techniques for extending the operational life of batteries such as disposable and rechargeable batteries. Most consumer electronic equipment use batteries. Batteries are classified in terms of primary batteries of dry cells, secondary batteries and rechargeable batteries. Many of electronic equipment are sensitive and need very precise voltages to operate properly. In some cases, if the battery supplying voltage to electronic equipment drops too low, not only does the equipment provide unreliable output, but the low voltage could also damage the equipment. As such, many manufacturers of electronic equipment include circuitry that detects battery voltage levels and if the voltage level drops below a certain level, the circuit would turn itself off. As an example, a fresh unused AA battery provides 1.5V. Over time, as the battery charge is consumed by the equipment that utilize the battery, the battery voltage starts to drop.

Some electronic equipment that use disposable batteries, such as AA batteries, are designed to stop operating when the battery voltage drops by 10% or so. That means when the voltage of an AA battery drops to about 1.4V or 1.35V, the battery is no longer useable by the equipment and has to be replaced with a fresh battery. Thus, the entire voltage range between 0V to 1.35V is wasted, resulting in significant inefficiency. This is akin to the scenario where only 10% of a soda bottle is consumed, as a matter of routine, and the rest discarded. This clearly would be very wasteful and inefficient.

Another factor impacting the cost of batteries is that some of the material used in manufacturing batteries are difficult to mine and in some cases are considered rare earth materials. The price of these materials have been on the rise since some are only found in countries like China, and China has started limiting the export of these materials.

In addition to the adverse economic impacts of battery inefficiencies, there are significant environmental impacts. There are about 3 billion batteries sold every year. Batteries pose a special environmental risk because they contain toxic material that can find their way into our natural resources such as ground water. They also are not biodegradable. Many nations as well as municipalities have laws and local ordinances about recycling of batteries. Furthermore, the carbon footprint associated with manufacturing and distribution of batteries raises concerns. The process of mining these materials, putting them in the batteries, packaging the batteries, and shipping them all over the world takes a lot of energy and generates a lot of greenhouse gases. Thus, improving the use efficiency of batteries provides significant economic as well as environmental benefits.

Thus, there is a need for techniques that improve the efficiency of batteries such as disposable and rechargeable batteries.

BRIEF SUMMARY

Embodiments of the invention provide techniques for significantly increasing the life of batteries. In accordance with one embodiment, a battery sleeve for extending the operational life of one or more batteries, includes a positive conductive electrode and an insulating layer extending below the conductive electrode such that when the sleeve is coupled to a battery, the positive conductive electrode is positioned above the positive terminal of the battery with the insulating layer electrically isolating the positive conductive electrode from the positive terminal of the battery.

In another embodiment, the battery sleeve further includes a negative conductive electrode configured so that when the sleeve is coupled to a battery, the negative conductive electrode is in electrical contact with the negative terminal of the battery.

In another embodiment, the battery sleeve further includes a voltage regulator circuit adapted to receive the positive and negative terminals of a battery and provide an output signal on an output terminal electrically connected to the positive conductive electrode.

In another embodiment, the battery sleeve includes a voltage regulator circuit adapted to receive the positive and negative voltages provided by the battery and generate a substantially constant output voltage on the battery sleeve's positive conductive electrode for the duration of the battery's operating life.

In another embodiment, the voltage regulator is housed in an upper portion of the battery sleeve near the positive conductive electrode. In an alternate embodiment, the voltage regulator is housed in a lower portion of the battery sleeve near the negative conductive electrode.

In another embodiment, when the battery sleeve is coupled to a battery, the positive conductive electrode of the sleeve serves as the new positive terminal of the battery.

In another embodiment, the battery sleeve is configured so that when the sleeve is coupled to a battery, the positive terminal of the battery is covered by the insulating layer such that the positive terminal is not externally electrically accessible.

In yet another embodiment, the battery sleeve is configured so that when the sleeve is coupled to a battery, the negative terminal of the battery is externally electrically accessible.

In accordance with another embodiment of the invention, a battery sleeve for extending the operational life of one or more batteries, includes a positive conductive electrode configured such that when the battery sleeve is coupled to at least one battery, the positive conductive electrode of the sleeve serves as the new positive terminal of the at least one battery.

In one embodiment, the battery sleeve further includes a voltage regulator adapted to receive the voltage provided by the at least one battery and generate a substantially constant output voltage for the duration of the operating life of the at least one battery In another embodiment, the battery sleeve further includes an insulating layer extending below the conductive electrode, wherein the sleeve is configured such that when the sleeve is coupled to a battery, the positive conductive electrode is positioned above the positive terminal of the battery with the insulating layer insulating the positive conductive electrode from the positive terminal of the battery.

In another embodiment, the battery sleeve further includes a negative conductive electrode configured so that when the sleeve is coupled to a battery, the negative conductive electrode is in electrical contact with the negative terminal of the battery.

In another aspect, a method is provided for extending the life of a battery. The method includes receiving a battery electrical power output from the battery. The battery electrical power output has a battery output voltage that decreases from a battery first output voltage to a battery second output voltage. The battery electrical power output is used to drive a converter that outputs a converter electrical power having a converter output voltage greater than the battery second output voltage. The converter electrical power is output from one or more output terminals configured to interface with one or more input terminals of a battery powered device. The converter can be configured and supported relative to the battery to interface with one or more output terminals of the battery. The converter can be embedded within the battery and the converter electrical power output outputted via terminals of the battery.

In many embodiments of the method, the converter output voltage has a substantially constant magnitude as the battery output voltage decreases from the battery first output voltage to the battery second output voltage. The battery second output voltage can be less than 70 percent of the battery first output voltage.

The method can include directly outputting the battery electrical power when the battery is producing a voltage exceeding a voltage required by a device powered by the battery. For example, the method can include outputting the battery electrical power output from the one or more output terminals configured to interface with one or more input terminals of a battery powered device as the battery output voltage decreases from the battery first output voltage to a voltage equal to or greater than a minimal voltage level that the battery powered device requires to operate normally.

To further extend the life of the battery, the method can include outputting a decreased voltage relative to a nominal voltage or a voltage initially produced by the battery. For example, the method can include decreasing the converter output voltage during at least a portion of the decrease of the battery output voltage from the battery first output voltage to the battery second output voltage. For example, the converter output voltage can decrease by less than 10 percent and the battery output voltage decreases by greater than 30 percent during the portion of the decrease of the battery output voltage from the battery first output voltage to the battery second output voltage. As another example, the converter output voltage can be less than the battery output voltage during an initial portion of the decrease of the battery output voltage from the battery first output voltage to the battery second output voltage.

In many embodiments of the method, the converter includes a step-up converter and a step-down converter. The step-up converter and the step-down converter can be controlled such that the converter output voltage is: a) less than the first voltage, b) greater than the second voltage, and c) varies by less than 10 percent as the battery output voltage decreases from the battery first output voltage to the battery second output voltage. The battery second output voltage can be less than 70 percent of the battery first output voltage.

The method can be practiced using any suitable battery and/or combination of suitable batteries. For example, the battery supplying the battery electrical power output can include separate batteries connected in series. As another example, the battery can be a 9 volt battery having standardized adjacent output terminals. As yet another example, the battery can have an exterior shell and the converter can be disposed within the exterior shell.

The method can include preventing polarity reversal. For example, the method can include preventing polarity reversal by blocking mating between a negative terminal of the battery and a positive input voltage terminal of the converter.

In another aspect, a battery sleeve for extending the operational life of one or more batteries is provided. The battery sleeve includes a positive conductive electrode, an insulating layer, and a voltage regulation circuit. The insulating layer extends below the conductive electrode such that when the sleeve is coupled to the one or more batteries, the positive conductive electrode is positioned above a positive terminal of the one or more batteries with the insulating layer electrically isolating the positive conductive electrode from the positive terminal. The voltage regulation circuit is adapted to receive a voltage provided by the one or more batteries and generate an increased output voltage on the positive conductive electrode relative to the provided voltage for at least a portion of the operating life of the one or more batteries. In many embodiments, the voltage provided by the one or more batteries decreases over the operational life of the one or more batteries from a battery first output voltage to a battery second output voltage that is less than 70 percent of the battery first output voltage.

In many embodiments of the battery sleeve, to further extend the life of the battery, the voltage regulation circuit can output a decreased voltage relative to a nominal voltage or a voltage initially produced by the battery. For example, the voltage regulation circuit can output the voltage provided by the one or more batteries to the positive conductive electrode as the voltage provided by the one or more batteries decreases from a battery first output voltage to a voltage equal to or greater than a minimal voltage level that the battery powered device requires to operate normally. As another example, the voltage regulation circuit can generate an output voltage greater than the voltage provided by the one or more batteries, the output voltage generated by the voltage regulation circuit decreasing during a portion of the operating life of the one or more batteries. For example, the voltage generated by the voltage regulation circuit can decrease by less than 10 percent and the voltage provided by the one or more batteries decreases by greater than 30 percent during the portion of the operating life of the one or more batteries in which the voltage generated by the regulation circuit decreases. As another example, the voltage generated by the voltage regulation circuit can be less than the voltage provided by the one or more batteries during an initial portion of the operating life of the one or more batteries.

In many embodiments of the battery sleeve, the voltage regulation circuit includes a step-up converter and a step-down converter. The step-up converter and the step-down converter are controlled such that the voltage generated by the voltage regulation circuit is: a) less than an initial voltage provide by the one or more batteries during the operating life of the one or more batteries, b) greater than a final voltage provided by the one or more batteries at the end of the operating life of the one or more batteries, and c) varies by less than 10 percent during the operating life of the one or more batteries. The final voltage provided by the one or more batteries can be less than 70 percent of the initial voltage provided by the one or more batteries.

The battery sleeve can be configured for use with any suitable battery and/or combination of suitable batteries. For example, the one or more batteries can include two or more batteries connected in series. The one or more batteries can include a 9 volt battery having standardized adjacent output terminals.

The battery sleeve can be configured to prevent inadvertent polarity reversal from incorrect coupling of the battery sleeve with the one or more batteries. For example, the battery sleeve can include a u-shaped element configured to accommodate the positive terminal of the one or more batteries when the battery sleeve is coupled with the one or more batteries and to block electrical connection between the voltage regulation circuit and a negative terminal of the one or more batteries so as to prevent polarity reversal in the voltage provided by the one or more batteries to the voltage regulation circuit.

In another aspect, a battery assembly having an extended operating life is provided. The battery assembly includes an outer shell, one or more voltage generating cells disposed within the outer shell and providing an output voltage, a positive voltage terminal, a negative voltage terminal, and a voltage regulation circuit disposed within the outer shell. The voltage regulation circuit receives the output voltage provided by the one or more voltage generating cells and generates an increased output voltage relative to the voltage provided by the one or more voltage generating cells over at least a portion of an operating life of the one or more voltage generating cells. The voltage regulation circuit is operatively connected to the positive and negative voltage terminals to output the generated increased output voltage via the positive and negative voltage terminals.

In another embodiment, a voltage regulation circuit is incorporated within a battery-powered device. The voltage regulation circuit is configured to extend the life of one or more batteries used to power the battery-powered device by outputting a voltage that is equal to or exceeds a minimum voltage required to operate the battery-powered device normally even when the one or more batteries output a voltage that is less than the minimum voltage required to operate the battery-powered device normally.

BRIEF DESCRIPTION OF THE DRAWINGS

FIG. 8A shows an inverted exploded view of a battery sleeve with a regulator circuit placed to interface with a positive terminal of a battery, in accordance with an embodiment.

FIG. 8B shows a battery and associated insertion path of the battery for coupling the battery with the battery sleeve of FIG. 8A.

FIG. 8C shows the battery of FIG. 8B coupled with the battery sleeve of FIG. 8A.

FIGS. 9A and 9B show regulator assemblies configured for use with a nine-volt battery, in accordance with an embodiment.

DETAILED DESCRIPTION

In the following description of the present embodiments, reference is made to the accompanying drawings that form a part hereof, and in which is shown by way of illustration specific embodiments in which the embodiments may be practiced. These embodiments are described in sufficient detail to enable those skilled in the art to practice the invention, and it is to be understood that other embodiments may be utilized and that process, electrical or mechanical changes may be made without departing from the scope of the present disclosure. The following detailed description is, therefore, not to be taken in a limiting sense.

Figure 1:
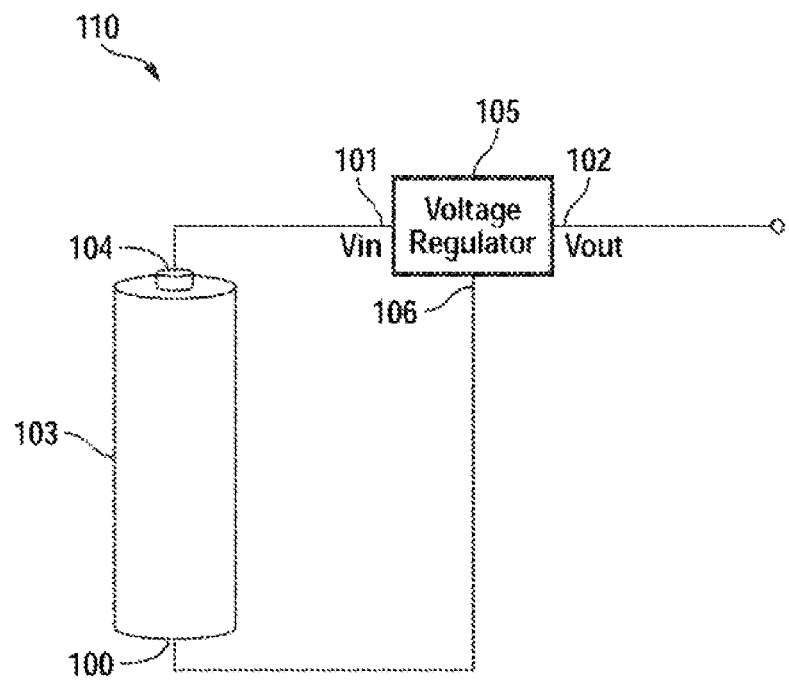
FIG. 1 shows a battery regulation system 110 according to one embodiment.

FIG. 1 shows a battery regulation system 110 according to one embodiment. Positive terminal 104 of battery 103 is connected to input terminal 101 of voltage regulator 105. Ground terminal 100 of battery 103 is connected to ground input terminal 106 of voltage regulator 105. In one embodiment, negative terminal 100 of the battery needs to be routed to where voltage regulator 105 is physically located. This could be accomplished via a flexible PCB that forms part of a battery sleeve which is described in more detail further below. Output terminal 102 of voltage regulator 105 provides the output of battery regulation system 110. There is an insulator placed between positive terminal 104 of battery 103 and output 102 of voltage regulator 105.

The operation of battery regulation system 110 is described next. In one exemplary embodiment of system 110, output 102 of system 110 is regulated to 1.5V. A fresh AA battery provides a voltage to regulator 105 in the range of 1.5V to 1.6V. Output 102 of regulator 105 is then regulated to 1.5V, and thus the output of battery regulation system 110 is fixed to 1.5V. In operation, as the device that uses battery regulation system 110 consumes current from battery 103, the battery gradually loses the charge that was originally placed in the battery thru chemical energy storage means. This causes the voltage output by battery 103 to decline over time. Regulator 105 however keeps providing a constant 1.5V at output terminal 102 even though the input voltage of the regulator is reduced below 1.5V. This in effect provides a constant voltage to the device that uses battery regulation system 110 until the voltage provided by battery 103 is reduced to the minimum voltage regulator 105 can operate with. In this example, that would be around 0.7V to 0.8V. This allows the end device to utilize battery 103 for a longer period of time. Also, a lot more of the stored charge in the battery is used before it is discarded.

Figure 2:
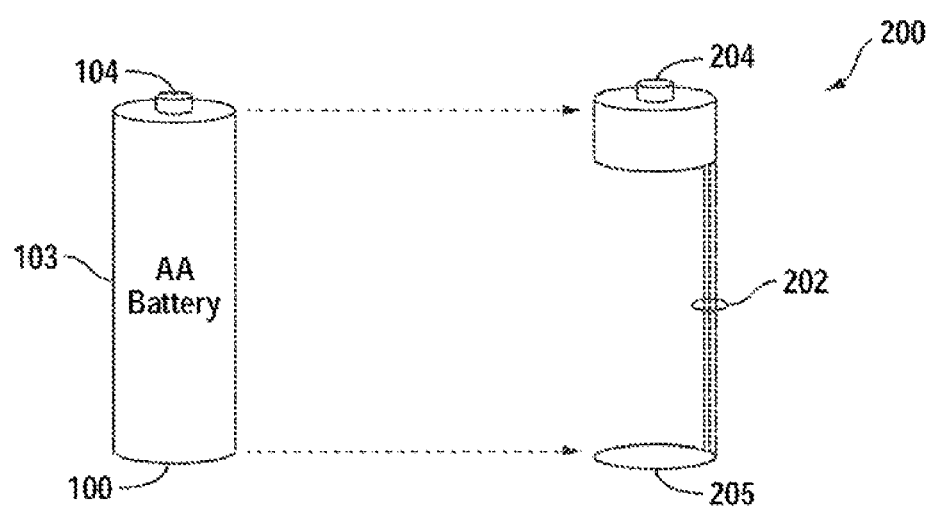
FIG. 2 shows a simplified diagram of a battery sleeve according to one embodiment.

FIG. 2 shows a simplified diagram of battery sleeve 200 according to one invention. Sleeve 200 when coupled to battery 103 covers the battery's top terminal 104. Sleeve 200 has an upper portion that fits snug around the upper portion of battery 103. Sleeve 200 is generally designed to ensure minimal increase in the overall dimension of the battery when coupled to the battery. Sleeve 200 contains an insulator (not shown) which electrically isolates positive terminal 104 of battery 103 from the new positive terminal 204 of battery sleeve 200. Sleeve 200 also includes a bottom section which includes a bottom conductor 205 that electrically connects to negative terminal 100 of battery 103. One or more conductive traces 202 route bottom conductor 205 to the regulator circuit (not shown) housed in the upper part of sleeve 200.

Figure 3:
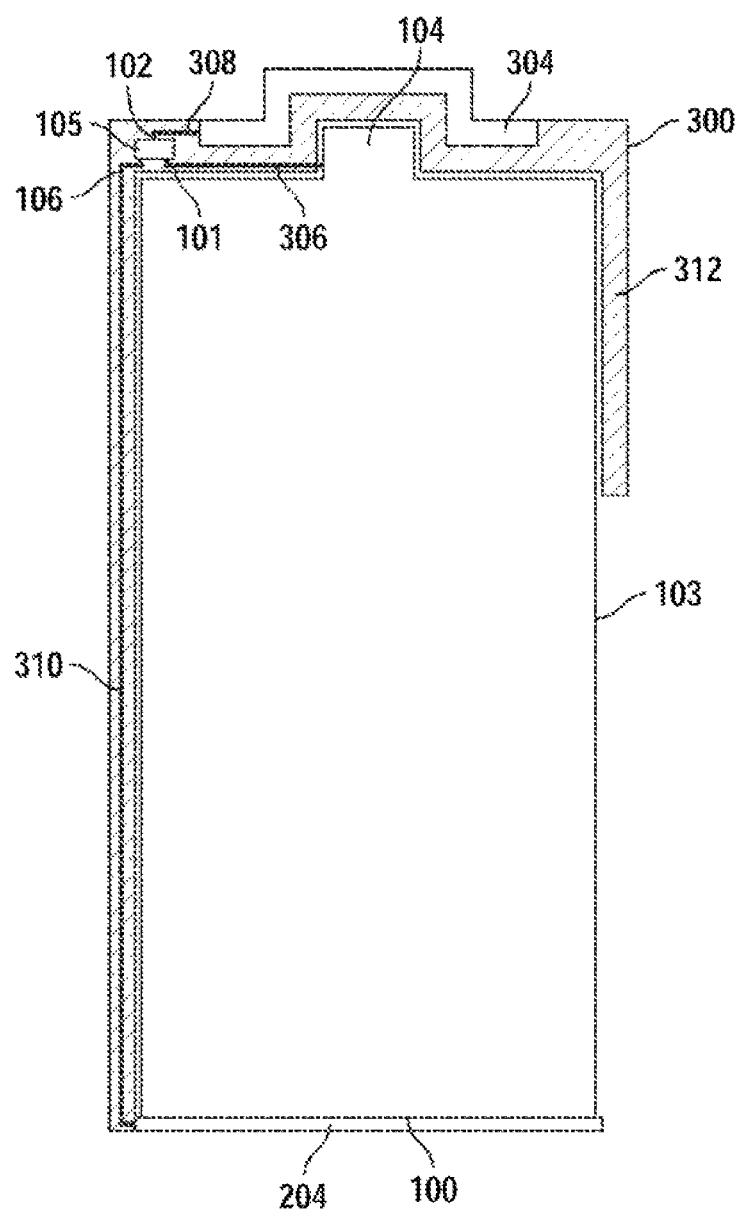
FIG. 3 shows a side view of a battery sleeve coupled to a battery, according to one embodiment.

FIG. 3 shows a side view of sleeve 300 coupled to battery 103, according to one embodiment. Sleeve 300 wraps around the top part of battery 103, and has a top conductor electrode 304 insulated from positive terminal 104 of battery 103 by insulator 312. In this embodiment, regulator 105 is housed in the upper part of sleeve 300. A conductive trace 306 extending in sleeve 300 connects input terminal 101 of regulator 105 to positive terminal 104 of battery 103. Another conductive trace 310 extending in sleeve 300 connects negative terminal 100 of battery 103 to input terminal 106 of regulator 105. Yet a third conductive trace extending in sleeve 300 connects output terminal 102 of regulator 105 to the sleeve's top conductor electrode 304. Conductive traces 306, 308 and 310 are insulated from one another. As described earlier, in operation, top conductive electrode 304 serves as the battery's "new" positive terminal.

Figure 4:
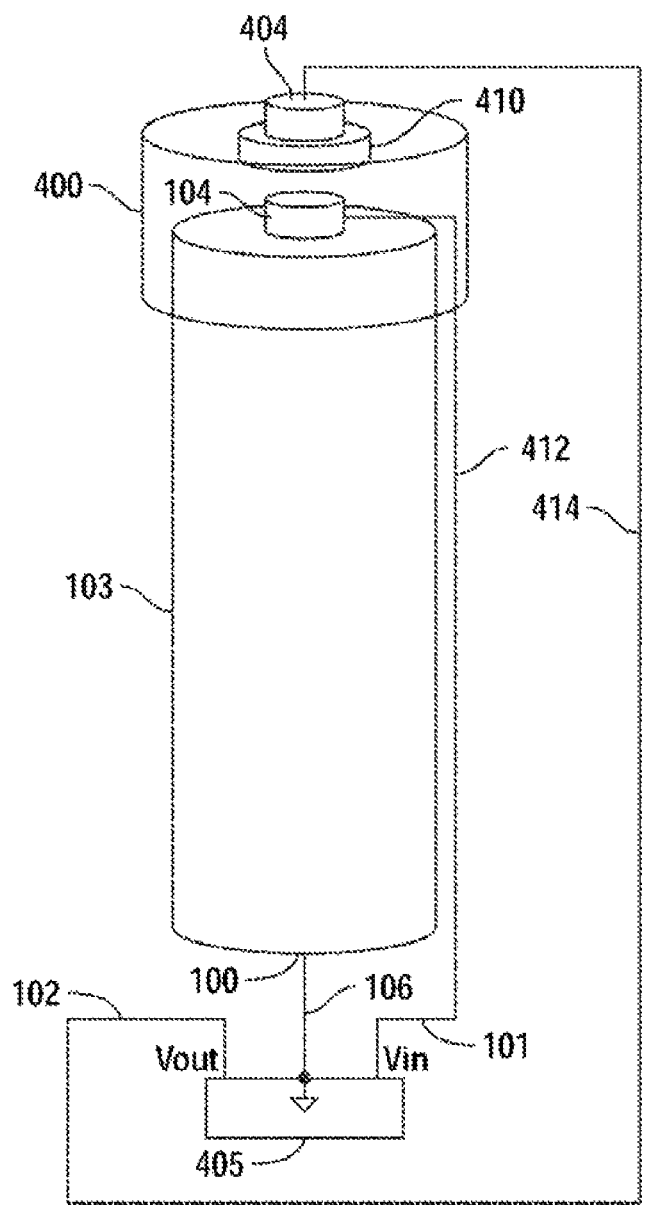
FIG. 4 shows a simplified diagram of a battery sleeve with the regulator circuit placed along a bottom portion of the sleeve according to one embodiment.

In an alternate embodiment shown in FIG. 4, regulator 405 is placed in a bottom portion of sleeve 400 close to where negative terminal 100 of battery 103 would be located when battery 103 is inserted in sleeve 400. In this embodiment, positive terminal 104 of battery 103 is routed by a conductive trace 412 extending through sleeve 400 to the bottom of the sleeve where regulator 405 resides. Conductive trace 412 routed to the bottom is connected to input terminal 101 of regulator 405, and the other input 106 of regulator 405 receives the negative terminal 100 of battery 103 which is present at the bottom of sleeve 400. Output terminal 102 of voltage regulator 405 is then routed up by conductive trace 414 and connected to top conductor electrode 404 of sleeve of 400. As in prior embodiments, the top conductor electrode 404 of the sleeve is insulated form positive terminal 104 of battery 103 by an insulating layer 410. In this embodiment, two conductive trances 412, 414 extend between the upper and lower portions of sleeve 400.

Figure 5:
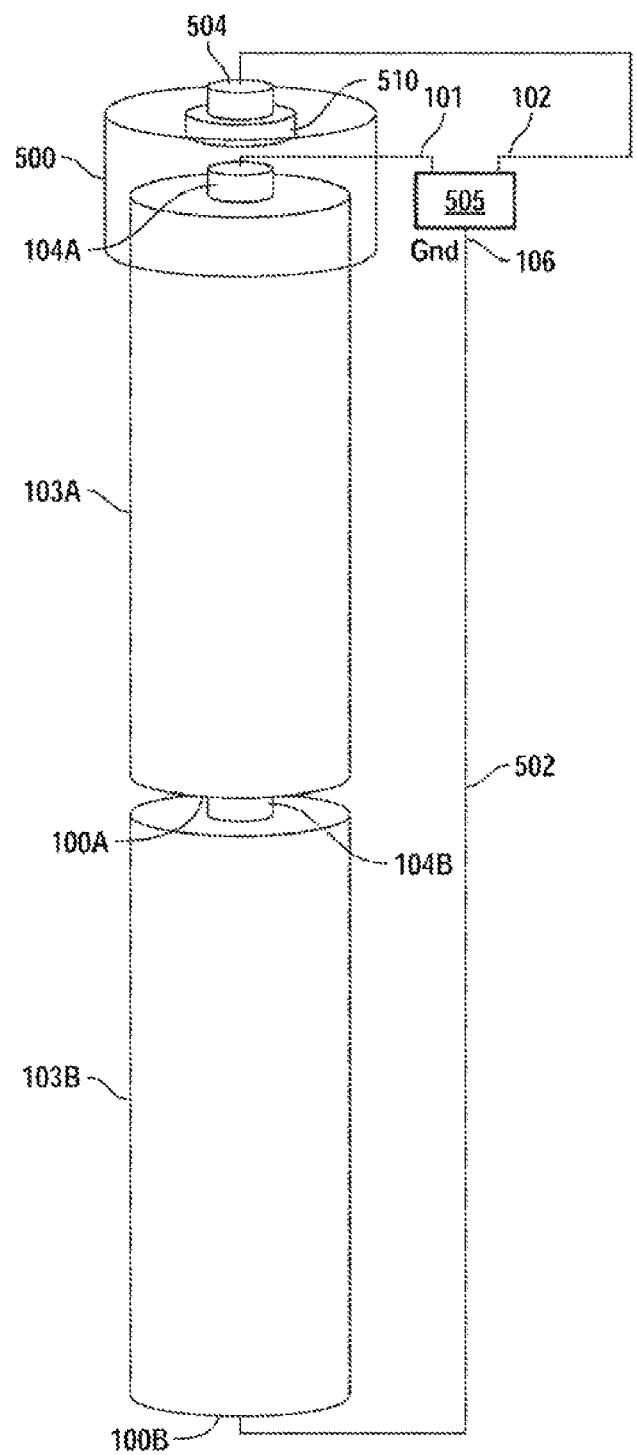
FIG. 5 is a simplified diagram showing an embodiment wherein a battery sleeve is adapted to couple to two serially-connected batteries.

FIG. 5 is a simplified diagram showing an embodiment wherein sleeve 500 is adapted to couple to two serially-connected batteries 103A, 103B. In this exemplary embodiment, batteries 103A, 103B are AA batteries providing a 3V output. Regulator 505 is shown in FIG. 5 outside sleeve 500 to minimize clutter. In practice, regulator 505 is housed in sleeve 500. Regulator 505 is used in a similar manner to the above embodiments. As in previous embodiments, as the voltage of the two batteries drop due to use, regulator 505 provides a constant regulated voltage equivalent to the doubled voltage of fresh batteries.

Figure 6A:
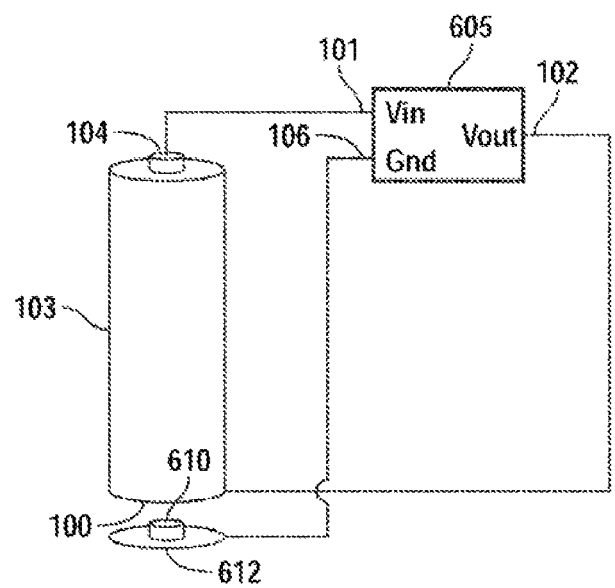
FIGS. 6A and 6B show yet another embodiment wherein the regulator and the sleeve are adapted so that the sleeve provides the positive terminal of the battery to external devices together with a regulated output voltage.
Figure 6B:
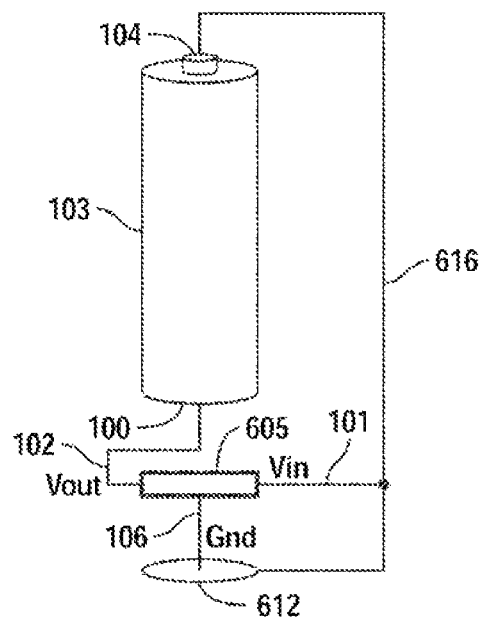

FIGS. 6A and 6B show yet another embodiment wherein the regulator and the sleeve are adapted so that the sleeve provides the positive terminal of the battery to external devices together with a regulated output voltage. FIG. 6A shows how positive terminal 104 and negative terminal 100 of battery 103 are interconnected with the voltage regulator 605. The regulator is shown separate from the sleeve for clarity, though in practice the regulator would be housed in the sleeve. FIG. 6A also depicts insulator 610 which insulates bottom electrode 612 of the sleeve from negative terminal 100 of battery 103. FIG. 6B more accurately reflects the physical location of regulator 605, which is along the bottom of the sleeve. In this embodiment, output 102 of voltage regulator 605 is used as a series voltage to the voltage of the battery. In the beginning when the battery is fresh, output 102 of voltage regulator 605 is set to 0V, or even negative, to make sure the voltage provided by the sleeve to external equipment remains at 1.5V. As the battery charge drops over time, voltage regulator 605 maintains a voltage at its output 102 substantially equal to 1.5V−V (Battery). In other words, the regulator monitors the voltage provided by battery 103 and if it falls below the regulated voltage, it then generates a voltage to compensate for the drop in the battery voltage. As an example, as the battery is used and its voltage drops to 1.1V, voltage regulator 605 provides a voltage of 0.4V at its output 102.

In accordance with embodiments of the invention, a battery sleeve when coupled to a battery, isolates the positive terminal of the battery from external devices, and during operation, regulates the battery voltage to a constant voltage and provides the regulated constant voltage in place of the original battery voltage to external devices. An advantage of such a battery sleeve is that even after the output voltage of the battery drops below the allowable operating voltage of the external equipment, the external equipment continues to receive a constant voltage and thus continues to operate and draw charge from the battery. It would continue doing so until such time that the output voltage of the battery drops below the range that the voltage regulation system can operate. In the AA battery example, without the battery sleeve, the battery needs to be thrown away when it drops from 1.5V to 1.4V or 1.35V. However, with the sleeve, the battery voltage can drop to as low as 0.8V or 0.7V while the external equipment continues to see 1.5V. It is noted that the current level of the battery sleeves need to be in line with the current needs of the end system.

If one looks at the potential return of such a device in terms of lifetime of a battery, one can see significant benefits. For instance, the AA battery in the above example would use roughly the equivalent charge of the battery output in the range of 1.5V to 1.4V. This means that after 0.1V drop, the battery's life is over. If the battery could be used until its voltage reaches 0.8V, then after 0.7V drop the battery's life is over. If one were to assume that the time versus the voltage drop is a linear function, then the life of the battery could be improved by a factor of 7 in this example. However, advantageously the time versus voltage drop is not quite linear. The time it takes for the battery voltage to drop by 0.1V is longer at lower voltages versus at higher voltages. That means that if a constant current was drawn from the battery, it would take the battery a lot longer to discharge from 1.2V to 1.1V than it would from 1.5V to 1.4V. This means that the extent to which the battery life is increased could be even higher than the factor of 7 in the above example above.

It is noted that the regulation circuit has a certain efficiency which cuts back on the extent to which the battery life is extended though the life time reduction is rather minimal. During operation, the regulator itself uses a certain amount of current from the battery. A lot of the available DC to DC converters have high efficiencies of around 95%. That is, of power supplied by the battery, 5% is used by the converter and the rest is available for the end user. However, the 5% efficiency loss due to use of a converter, when compared to the 700% gain in efficiency of the battery, is negligible. It is further noted, that the converter efficiency may drop as the battery voltage drops due to use. For example, as the battery voltage drops from 1.5V to 1V, the efficiency of the converter may drop down to 50% to 60%. However, 50% efficiency is still a significant improvement over the current approach of discarding the batteries because their voltage has dropped below the operable voltage range (i.e., 1.4-1.5V).

The economics of the present invention are attractive. While there may be some cost associate with implementing the present invention, such cost is more than off-set by cost savings achieved in extending the life a battery to equivalent of 5 to 7 batteries. The implementation can be external to the battery as described in various embodiments above or alternatively battery manufacturers could incorporate the regulator circuit and the associated connections inside the battery-housing during the manufacturing process. However, the attachable sleeve implementation has the added advantage that it can be used over and over again. That is, once the battery inside the sleeve is completely used up, the used up battery could be tossed and another battery could be placed inside the sleeve. So, the cost of the sleeve is spread among many batteries thus minimizing the added cost per battery. The attachable sleeve has the added benefit (over the implementation where the regulator is incorporate inside batteries) that the existing battery manufacturing processes, equipment, and factories do not need to be changed.

It is noted that the battery compartment of most, if not all, electronic equipment need not be retrofit to accommodate the battery sleeves. While the sleeve slightly increases the height of the battery, the spring in battery compartments used to hold the battery in place can accommodate the added height. The length of the spring is typically in the range of 5 mm to 10 mm. The height increase of the battery due to the sleeve is about 1 mm. The extra height is easily accommodated by the spring compressing one more millimeter when the battery with the sleeve is inserted in the battery compartment. The thickness of the sleeve could of course be reduced as technology advances. For batteries such as 9V batteries where both positive and negative terminals are located along the same end of the battery, the sleeve would have even less of an impact on the size of the battery. That is because for such batteries, the sleeve is simply a male to female converter with an insulator to isolate the battery's positive terminal from the output of the voltage regulator.

In another embodiment, multiple batteries could be placed in series and one sleeve can encompass the series of batteries, such as that shown in FIG. 5. As described with the FIG. 5 embodiment, the output voltage of the serially connected batteries would be used as input to the voltage regulator and the constant output voltage provided by the regulator is provided to external devices. It is noted that the life of such serially connected batteries is increased even more than the case of a single battery, as explained next. A single AA battery, when used without the sleeve, would be tossed when its voltage drops from 1.5V to 1.35V. When used with the sleeve, the battery can be used down to 0.8V. If the battery discharge time was linearly related to the discharge rate of the battery, then the life extension time would be 0.7V/0.15V or more than 4 times. In contrast, in the case where two AA batteries are serially connected and no sleeve is used, the two batteries would need to be tossed when the voltage of the serially connected batteries drops from 3V to 2.7V. When used with a sleeve, the serially connected batteries can be used from 3V down to 0.8V. The life extension time would then be proportional to (3−0.8)/(3−2.7)=2.2/0.3 which results in battery life extension of over 7 times. This assumes a linear relationship between the output voltage and time. However, as explained above, batteries behave non-linearly in that the time it takes to drop by 0.1V from 1.5V to 1.4 v is much shorter than the time it takes to go from 1.3 v to 1.2 v. This advantageously further increases the battery life when a sleeve is used.

In yet another embodiment, the apparatus of the current invention is used in conjunction with rechargeable batteries. There is a phenomenon with rechargeable batteries called shadow effects. If a battery is discharged by a small amount and then fully charged, and if that process is repeated numerous times, the battery loses its ability to hold charge. The current embodiments enable the rechargeable batteries to operate for a much longer time and hence reduce the need to recharge by the end user as frequently.

Another known phenomenon is that if a rechargeable battery is allowed to discharge beyond a certain limit, the number of times that it can be charged is reduced dramatically. The current embodiments include a voltage detection system that detects when the battery reaches the lower limit and shuts off the output voltage, hence increasing the number of times the battery can be charged.

In one embodiment, printed silicon on metal technology can be used to implement the sleeve, the regulator circuitry and its associated connections. There is new technology that uses material other than silicon to process circuitry. These types of printed silicon, which in some cases are printed on stainless steel, could be used to shape the sleeve that goes around the battery. It would also allow for better thermal characteristics.

In yet another embodiment, a flexible PCB could be used to route terminals from one side of the battery to the other side. These flexible, thin layers would allow the sleeve to be very thin.

In yet another embodiment, the efficiency of the regulator system could be adjusted such that while the system would allow for the maximum current output capability of the regulator system to be quite high, the efficiency would be maximum at the output current level that the end system usually runs. For example, if the battery is used in a remote control system, where the average current consumption of the remote control system is 50 mA, then the voltage boosting system, which may be a DC to DC conversion system, is set to be as high as possible at that output current level.

Figure 7:
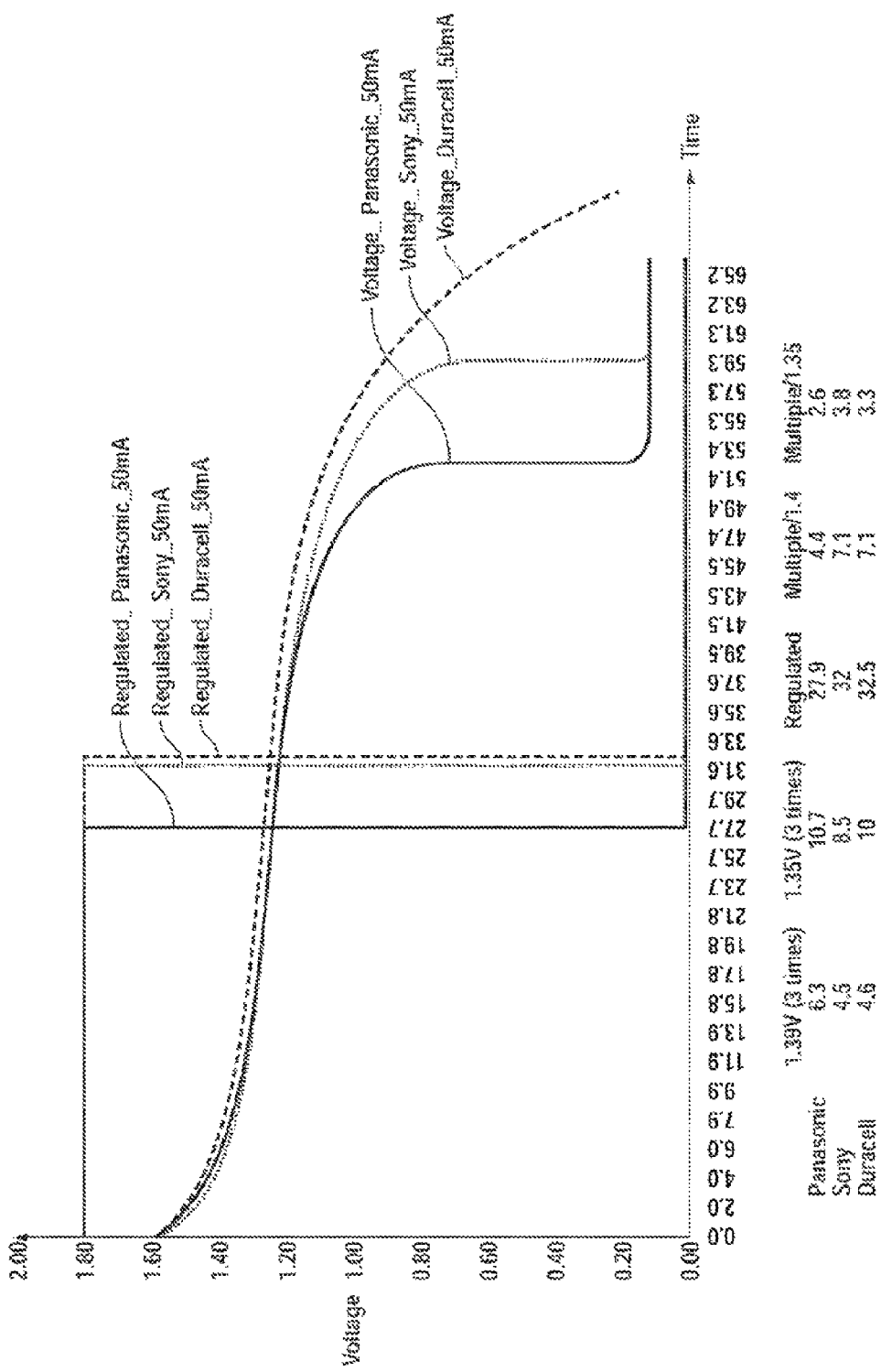
FIG. 7 shows actual measurements that illustrate the advantages of the various embodiments.

FIG. 7 shows measurements that illustrate the advantages of the various embodiments. Three popular AA battery brands, Panasonic, Duracell and Sony were chosen for the measurements. Active load circuitry that drew a fixed 50 mA current was placed at the output of these batteries and the voltage of each battery was measured over time. The horizontal access shows time and the vertical access shows the battery voltage. The starting voltage for these fresh batteries was 1.6V. The amount of time it takes for the batteries to reach 1.39V, which is where a lot of electronic equipment stop operating, are listed. The Panasonic battery took 6.3 hours to reach that level, while it took 4.5 hours for the Sony battery. The Panasonic battery when used in conjunction with a regulator, according to embodiments of the invention, took 27.9 hours before it stopped providing 1.5V, and the Sony battery when used with a regulator took 32 hours before its stopped providing 1.5V. Thus, with the regulator, it takes 4.5 to 7 times longer before the battery needs to be replaced. Thus, the total number of batteries that need to be manufactured and consequently discarded would be reduced by 4 to 7 times. This would have a significant impact on our planet if one takes into account the carbon footprint for extracting all the battery material, their manufacturing, their transportation to stores, their packaging as well as all of the toxic material that end up in our landfills.

FIG. 8A shows an inverted exploded view of a battery sleeve assembly 700 that includes a regulator circuit 705 placed to interface with a positive terminal of a battery and a battery sleeve 710, in accordance with an embodiment. The regulator circuit 705 can be formed on a suitable substrate (e.g., organic based, ceramic based, a flexible printed circuit (FPC), a rigid-flexible printed circuit (RFPC). The regulator circuit 705 can be configured in accordance with any suitable regulator circuit described herein and provide corresponding regulation. The sleeve 710 supports the substrate and can be configured to fit over any suitable standard battery (e.g., AA, AAA, C, D) as illustrated in FIGS. 8B and 8C. The sleeve 710 can be made from a conductive material that is coated with a non-conductive material except where the sleeve 710 is electrically connected to the regulator circuit 705 and where the sleeve 710 contacts the negative terminal of the battery. The non-conductive material coating prevents electrical shorting between the negative terminal with any metal cylinder wall of a battery-operated device such as in a flashlight. The sleeve 710 includes a side portion 712, a bottom portion 714, and a top portion 716. The side portion 712 has cylindrical inner and outer surfaces separated by a thickness (e.g., less than 1 mm) that is selected to provide adequate strength and stiffness while being thin enough to enable the combination of the battery sleeve assembly 700 and the battery to be installed within battery-operated devices configured to accommodate the battery.

The top of the regulator circuit 705 has a spring contact 718. The spring contact 718 is configured to extend the overall length of the battery and also to be deflectable to become completely flat when connecting two batteries physically in series. The configuration of the spring contact 718 enables the combination of the battery and the battery sleeve assembly 700 to fit within battery powered devices configured to house the battery even with the addition of the battery sleeve assembly 700. FIG. 8C shows the combination of the battery installed into the battery sleeve assembly 700.

Figure 8D:
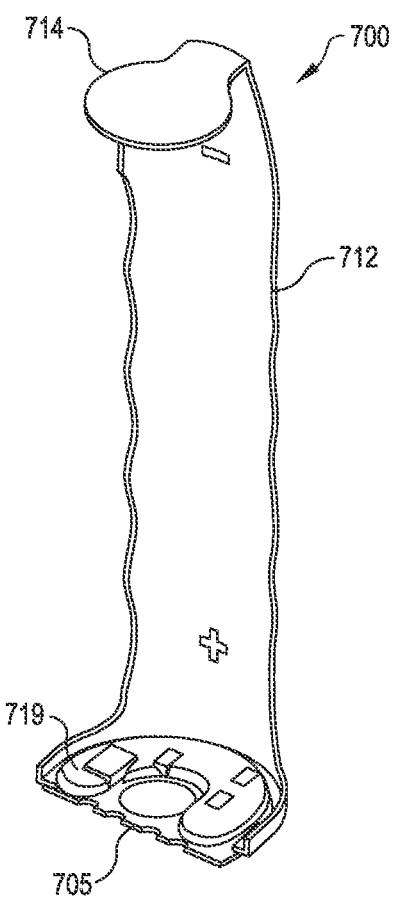
FIGS. 8D, 8E, and 8F illustrate a battery sleeve configuration configured to prevent polarity reversal, in accordance with an embodiment.
Figure 8E:
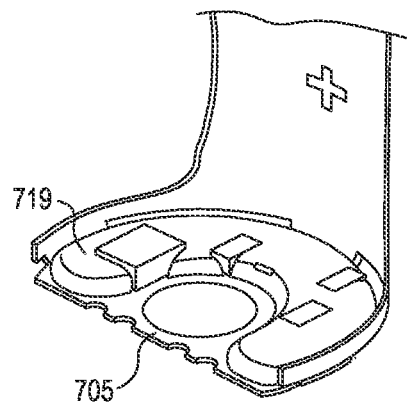
Figure 8F:
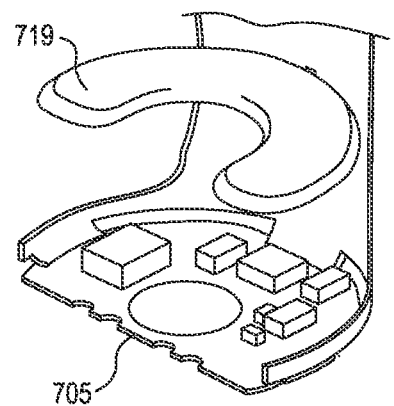

FIGS. 8D, 8E, and 8F illustrate a battery sleeve configuration configured to prevent polarity reversal, in accordance with an embodiment. FIG. 8D shows the battery sleeve assembly 700 with an encapsulation element 719 configured to prevent inadvertent polarity reversal. The encapsulation element 719 has a u-shaped configuration shaped to accommodate mating of a positive battery terminal with a positive input contact on the substrate 705 while blocking mating of a negative battery terminal with the positive input contact on the substrate 705. FIG. 8E shows a close-up view of the substrate 705 and the encapsulation element 719. FIG. 8F shows a close-up exploded view of the substrate 705 and the encapsulation element 719. The encapsulation element 719 can be formed from a suitable non-conductive encapsulation material and can further serve to protect battery sleeve components such as regulator circuit components located on the substrate 705 from contact induced damage.

FIG. 9A shows a regulator assembly 720 configured for use with a nine-volt battery 721, in accordance with an embodiment. The regulator assembly 720 includes a female input voltage connector 722 configured to couple with the male positive terminal 723 of the battery 721, a male input voltage connector 724 configured to couple with the female negative terminal 725 of the battery 721, a substrate assembly 726, a male positive voltage output terminal 727, and a female negative voltage output terminal 728. The substrate assembly 726 includes a regulator circuit 729. The regulator circuit 729 is electrically connected to the female input voltage connector 722 and the male input voltage connector 724 so as to receive output voltage and current from the battery 721. The regulator circuit 729 outputs a regulated voltage to the output terminals 727, 728 using any suitable approach such as described herein.

FIG. 9B shows another regulator assembly 730 configured for use with a nine-volt battery 721, in accordance with an embodiment. The regulator assembly 730 is similar to the regulator assembly 720 described above, but includes a lower base plate 731 and an upper base plate 732. The lower base plate 731 supports the input voltage connectors 722, 724. The upper base plate 732 supports the output terminals 727, 728. The regulator circuit 729 is sandwiched between the upper and lower base plates 731, 732, thereby being protected from incidental contact damage.

Figure 10A:
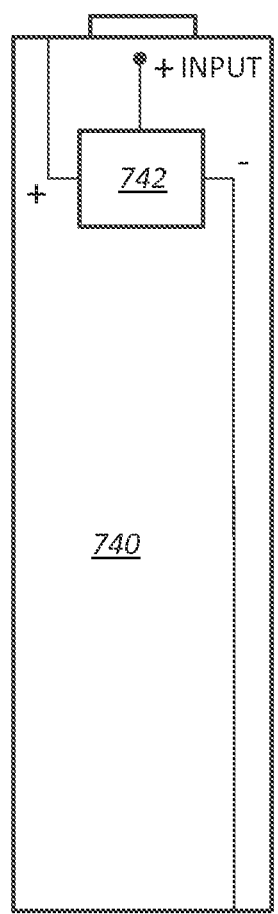
FIGS. 10A and 10B shows a battery that includes a regulator circuit disposed within an exterior shell of the battery, in accordance with an embodiment.
Figure 10B:
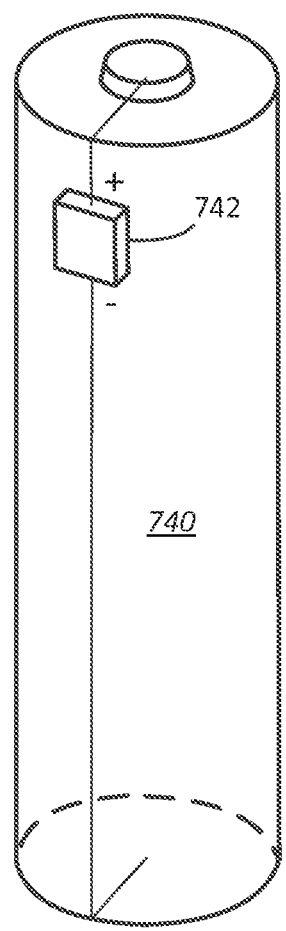

FIGS. 10A and 10B shows a battery 740 that includes a regulator circuit 742 disposed within an exterior shell of the battery 740, in accordance with an embodiment. The regulator circuit 742 can be configured similar to the other regulator circuits described herein. The regulator circuit 742 can be embedded within the battery using any suitable approach to isolate the regulator circuit 742 from substances within the battery. For example, the regulator circuit 742 can be embedded within a potting material such as a suitable resin, silicone, a ultraviolet light curable acrylic potting compound, polyester, a hot melt material, etc. The regulator circuit 742 can also be embedded via a suitable casting process, via encapsulation or dip coating, and via encapsulation via printed circuit board (PCB) conformal coating.

Figure 11:
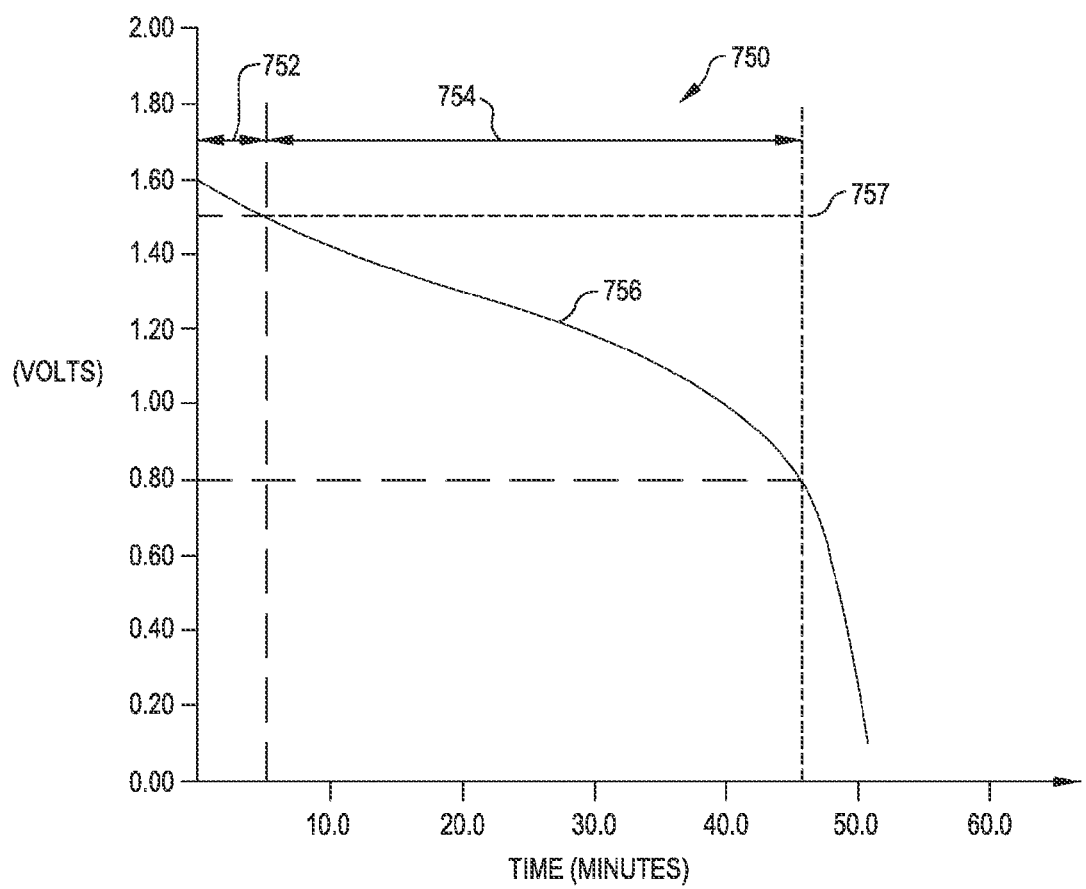
FIG. 11 illustrates a two-phase voltage regulation approach having a bypass phase, in accordance with an embodiment.

FIG. 11 illustrates a two-phase regulation approach 750 having a bypass phase 752 and a boost phase 754, in accordance with an embodiment. In the bypass phase 752, the battery output voltage 756 is greater than or equal to a selected voltage level 757 (e.g., 1.5 volts as illustrated). Any suitable voltage (e.g., 1.55 volts, 1.50 volts, 1.45 volts, etc.) can be used as the selected voltage level 757. In many instances, a fully charged battery will output a voltage in excess of its nominal voltage rating. In the illustrated example, the battery output voltage 756 is 1.60 volts at time zero and decreases over time to 1.50 volts at about 5 minutes of use and further to 0.80 volts at about 46 minutes of use. While the battery output voltage 756 is greater than or equal to the selected voltage level 757, the regulator circuit outputs the battery output voltage 756 directly via a suitable bypass circuit as described herein. After the battery output voltage 756 drops below the selected voltage level 757, the battery output voltage 756 is used to drive the regulator circuit, which outputs the selected voltage level 757 during the boost phase 754. By utilizing the bypass phase 752 while the battery output voltage is equal to or greater than the selected voltage level 757, power losses associated with boosting the battery output voltage are avoided during the bypass phase 752.

Figure 12:
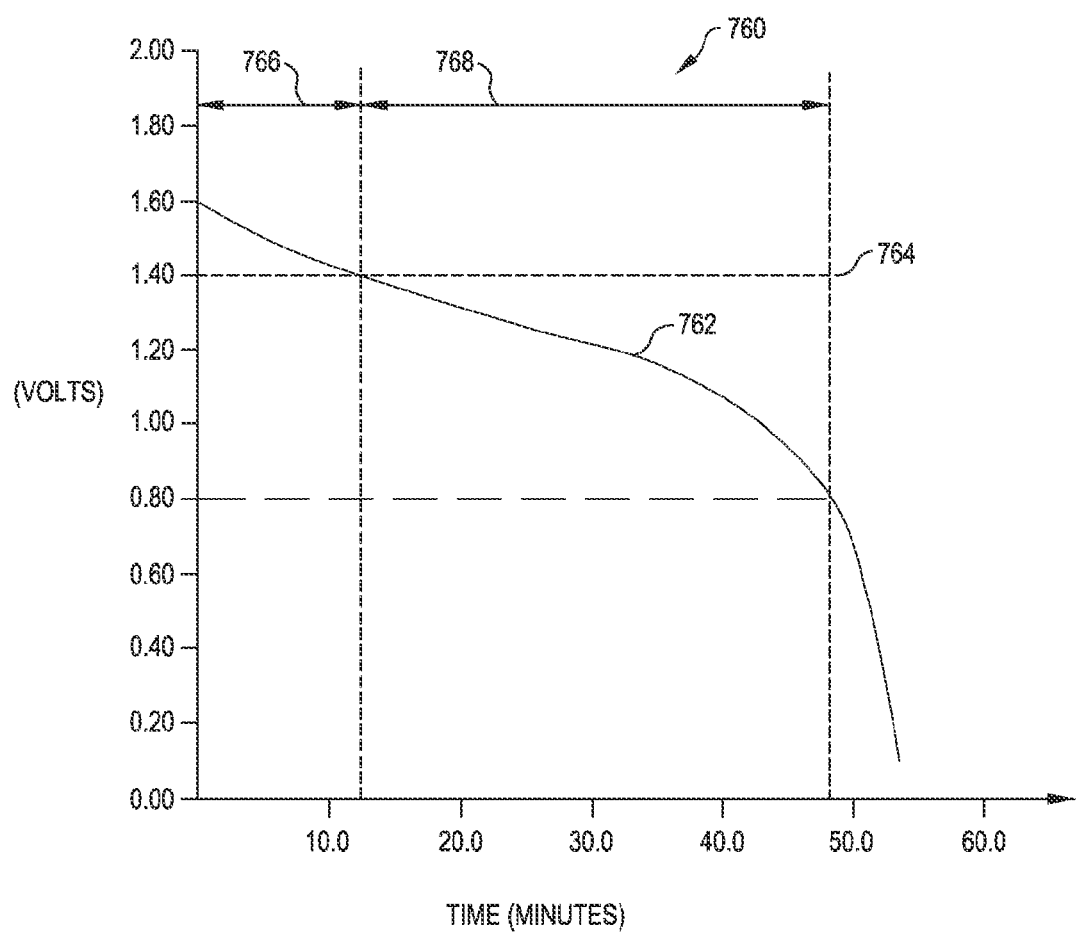
FIG. 12 illustrates a voltage regulation approach utilizing both voltage increase and decrease relative to battery output voltage, in accordance with an embodiment.

FIG. 12 illustrates a regulation approach 760 utilizing both voltage increase and decrease relative to battery output voltage, in accordance with an embodiment. In the example shown, a battery output voltage 762 decreases over time during an example use from 1.60 volts at time zero to a selected voltage level 764 (e.g., 1.40 volts in the illustrated example) at about 12 minutes of use and to 0.80 volts at about 48 minutes of use. During a first phase 766, the selected voltage 764 output by a regulator circuit to a battery-powered device is decreased relative to the battery output voltage 762 used to drive the regulator circuit. For example, the regulator circuit can include a step-down converter circuit as described herein to output a decreased output voltage relative to the battery output voltage 762 during the first phase 766. During a second phase 768, the selected voltage 764 output by a regulator circuit to a battery-powered device is increased relative to the battery output voltage 762 used to drive the regulator circuit. For example, the regulator circuit can further include a step-up converter circuit as described herein to output an increased output voltage relative to the battery output voltage 762 during the second phase 768.

Figure 13:
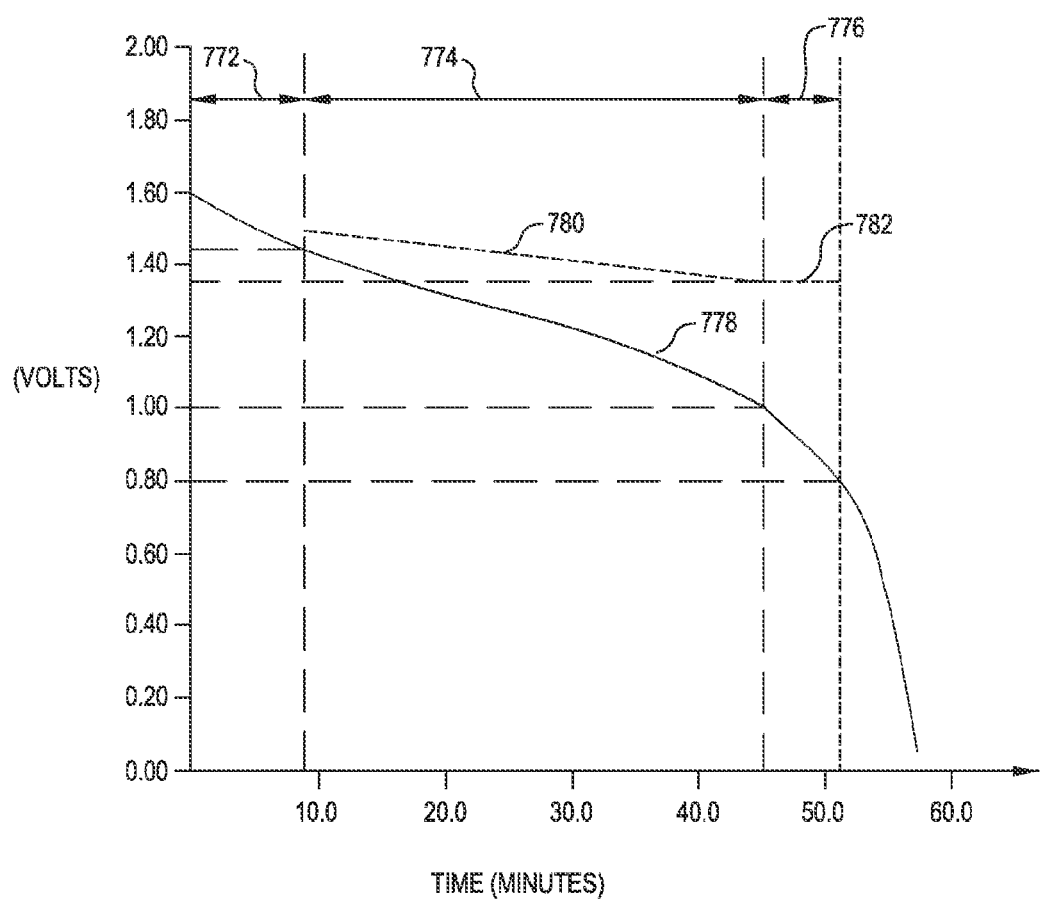
FIG. 13 illustrates a three-phase voltage regulation approach including a voltage variation phase, in accordance with an embodiment.

FIG. 13 illustrates a three-phase regulation approach 770 that includes a bypass phase 772, a voltage variation phase 774, and a constant voltage phase 776. During the bypass phase 772, a battery output voltage 778 is directly output by a regulator circuit to a battery powered device as described herein. The bypass phase is used where the battery output voltage 778 exceeds a first selected voltage level (e.g., 1.45 volts in the illustrated example). Any suitable voltage level can be used as the first selected voltage level. When the battery output voltage 778 is below the first selected voltage level and above a second selected voltage level (e.g., 1.00 volts in the illustrated example), the battery output voltage 778 is used to drive a regulator circuit that is controlled to output a varying output voltage 780. In the illustrated example, the varying output voltage 780 decreases from 1.50 volts when the battery output voltage 778 is 1.45 volts down to 1.35 volts when the battery output voltage 778 is 1.0 volts. During the constant voltage phase 776, the battery output voltage 778 is used to drive the regulator circuit that is controlled to output a constant output voltage 782 (e.g., 1.35 volts in the illustrated example). By decreasing the amount of voltage boost supplied by the regulator circuit, the efficiency of the regulator circuit is improved thereby yielding increased effective battery life.

Figure 14:
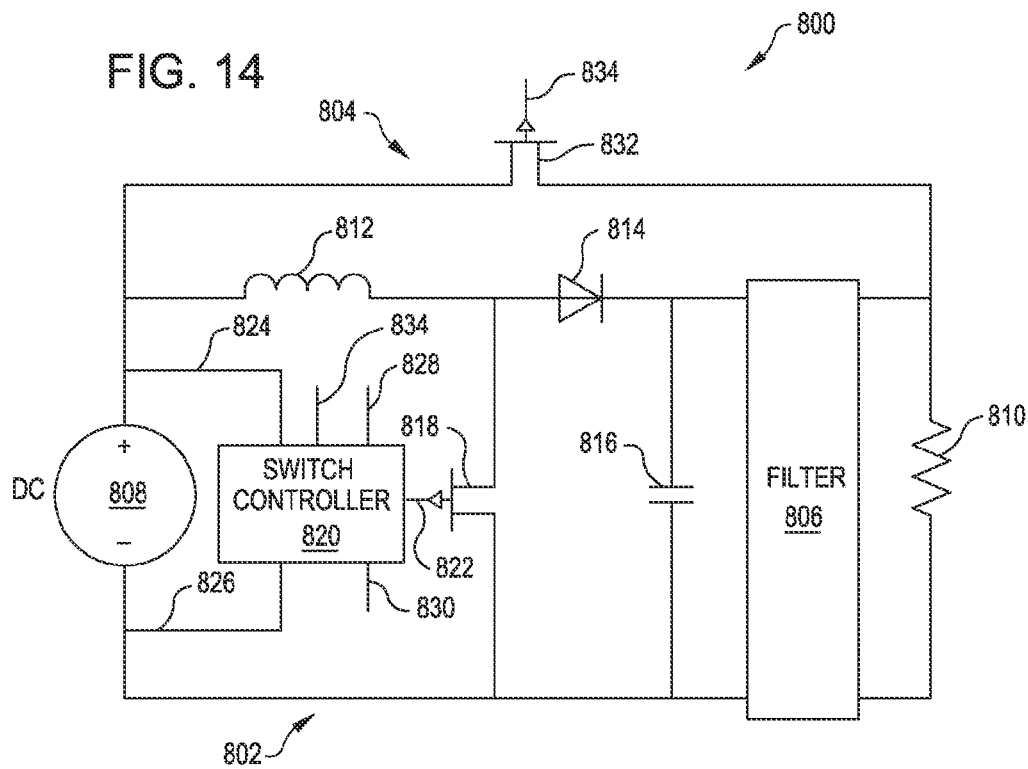
FIG. 14 is a simplified diagram showing a voltage regulation circuit including a step-up converter, a bypass circuit, and a filter circuit, in accordance with an embodiment.

FIG. 14 is a simplified diagram showing a voltage regulation circuit 800 including a step-up converter 802, a bypass circuit 804, and a filter circuit 806, in accordance with an embodiment. The voltage regulation circuit 800 can be used to provide the functionality described herein with respect to extending the life of a battery. The step-up convert 802 receives output from a battery 808 and outputs a regulated voltage to the filter circuit 806, which then delivers a smoothed voltage output to a battery-powered device 810. The filter circuit 806 can include any suitable combination of one or more inductors and/or capacitors to smooth voltage variations in the voltage output by the step-up converter 802.

The step-up converter 802 includes an inductor 812, a diode 814, a capacitor 816, a controlled switch 818 (e.g., a MOSFET), and a switch controller 820. The switch controller 820 regulates the resulting ratio between the voltage output by the step-up converter 802 and the voltage supplied by the battery 808 via controlled opening and closing of the switch 818. When the switch 818 is closed, current flowing through the inductor 812 increases. When the switch 818 is opened, the inductor 812 drives a decreasing current amount through the diode 814, which results in a charging of the capacitor 816, which boosts the voltage supplied to the filter circuit 806 and thus to the battery-powered device 810 relative to the voltage output by the battery 808. The diode 814 serves to prevent discharging of the capacitor 816 via backflow of current through the switch 181 when the switch 818 is closed. By cycling the switch 818 between opened and closed at a rate selected to provide desired charge levels to the capacitor 816, a controlled increase in voltage supplied to the battery-powered device 810 relative to the voltage output by the battery 808 is produced.

The switch controller 820 controls the opening and the closing of the switch 818 via a control lead 822 connected with the switch 818. The switch controller 820 controls the switch 818 in accordance with voltage inputs 824, 824 from the battery 808 and voltage inputs 828, 830 from the voltage output by the voltage regulation circuit 800 to the battery-powered device 810. For example, the switch controller 820 can include any suitable control electronics (e.g., a microprocessor, a microcontroller, etc.) that employs a suitable approach (e.g., via a lookup table) for varying the off-on duty cycle of the switch 818 to output desired voltage levels to the battery-powered device 810 as described herein for the varying voltages output by the battery 808 during the battery's life.

The bypass circuit 804 includes a bypass switch 832 that is controlled by the switch controller 820 via a control lead 834. By closing the bypass switch 832 and opening the step-up converter switch 818, the battery output voltage can be supplied directly to the battery-powered device 810 in accordance with the bypass phase described herein.

Figure 15:
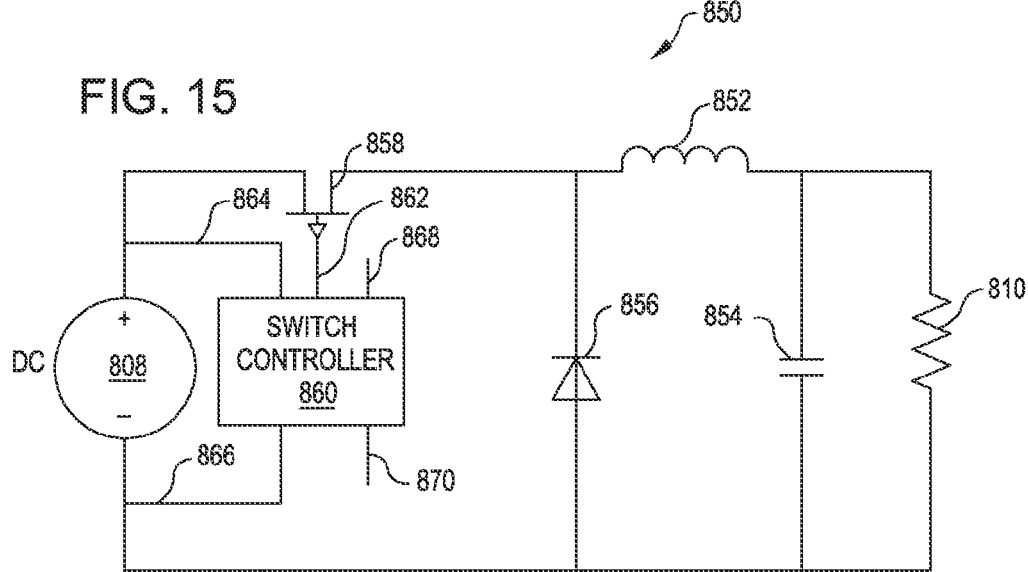
FIG. 15 is a simplified diagram showing a step-down converter circuit, in accordance with an embodiment.

FIG. 15 is a simplified diagram showing a step-down converter circuit 850, in accordance with an embodiment. The step-down converter circuit 850 is operable to reduce the voltage supplied to a battery-powered device 810 from a battery 808 so as to extend the life of a battery, for example, during the first phase 766 described with reference to the voltage regulation approach illustrated in FIG. 12.

The step-down converter circuit 850 includes an inductor 852, a capacitor 854, a diode 856, a controlled switch 858, and a switch controller 860. The switch controller 860 controls opening and closing of the switch 858 via a control lead 862. When the switch is closed, current flows through the inductor 852 at an increasing rate. If the switch remains in the closed position, the voltage supplied to the battery-powered device 810 increases to reach the voltage output by the battery 808. When the switch 858 is open, the voltage supplied to the battery-powered device 810 is provided via discharge of the capacitor 854. If the switch remains in the open position, the voltage supplied to the battery-powered device 810 will reduce to zero over time. By cycling the switch 858 between open and closed at a rate selected to provide desired charge levels to the capacitor 854, a desired decrease in voltage supplied to the battery-powered device 810 relative to the voltage output by the battery 808 is produced.

The switch controller 860 controls the opening and the closing of the switch 858 via a control lead 862 connected with the switch 858. The switch controller 860 controls the switch 858 in accordance with voltage inputs 864, 866 from the battery 808 and voltage inputs 868, 870 from the voltage output by the voltage regulation circuit 850 to the battery-powered device 810. For example, the switch controller 860 can include any suitable control electronics (e.g., a microprocessor, a microcontroller, etc.) that employs a suitable approach (e.g., via a lookup table) for varying the off-on duty cycle of the switch 858 to output desired voltage levels to the battery-powered device 810 as described herein for the varying voltages output by the battery 808 during the battery's life.

Figure 16:
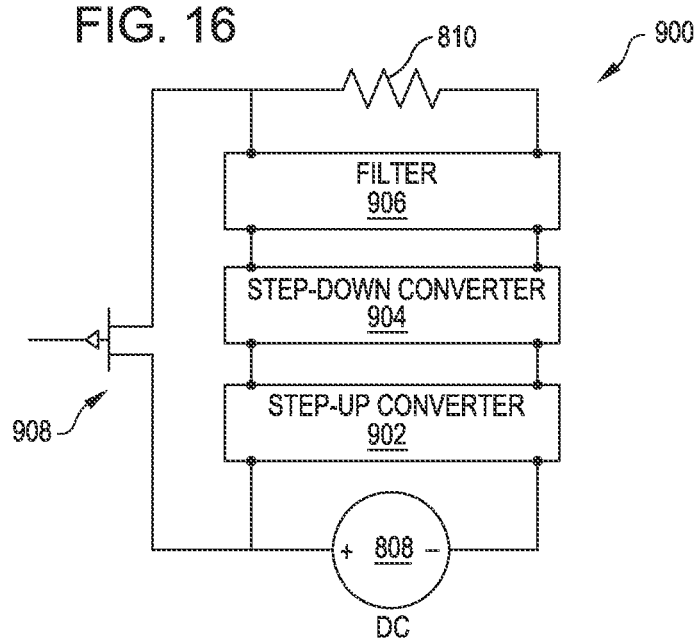
FIG. 16 is a simplified diagram showing a voltage regulation circuit including a step-up converter, a step-down converter, a filter, and a bypass circuit, in accordance with an embodiment.

FIG. 16 is a simplified diagram showing a voltage regulation circuit 900 that includes a step-up converter 902, a step-down converter circuit 904, a filter 906, and a bypass circuit 908, in accordance with an embodiment. The step-up converter 902 receives voltage output by a battery 808 and output a regulated voltage to the step-down converter 904. The step-up converter 902 is configured to controllably increase the voltage output from the step-up converter relative to the voltage supplied by the battery 808. In the illustrated embodiment, the step-down converter 904 receives voltage output by the step-up converter 902 and outputs a regulated voltage to the filter 906. Alternatively, the positions of the converters 902, 904 can be reversed with the step-down converter 904 receiving voltage from the battery 808 and outputting regulated voltage to the step-up converter 902. The filter 906 is configured to smooth the regulated voltage supplied to the filter and output a smoothed regulated voltage to the battery-powered device 810. Any suitably configured step-up converter 902 can be employed, such as the step-up converter 802 described herein. Any suitably configures step-down converter 904 can be employed, such as the step-down converter 850 described herein. The bypass circuit 908 is configured and function similar to the bypass circuit 804 described herein.

Figure 17:
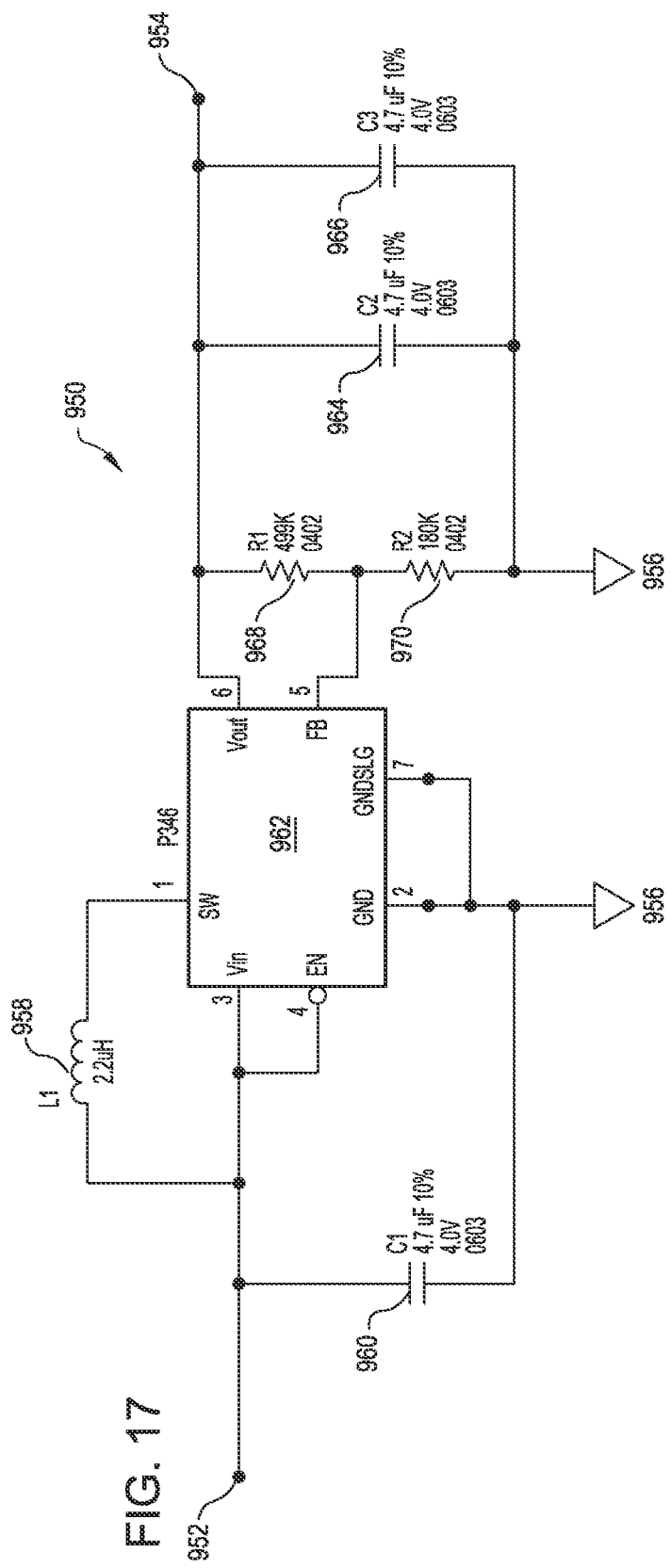
FIG. 17 is a circuit diagram showing a voltage regulation circuit for providing a stepped up voltage and a native bypassed voltage, in accordance with an embodiment.

FIG. 17 is a circuit diagram showing a voltage regulation circuit 950 for providing a stepped up voltage and a native bypassed voltage, in accordance with an embodiment. The voltage regulation circuit 950 can be used in any suitable method or device described herein. The voltage regulation circuit 950 receives an input voltage via an input voltage connection 952 and outputs an output voltage via an output voltage connection 954. The voltage regulation circuit 950 is connected to a ground 956 (e.g., a negative terminal of a battery to which the input voltage connection 952 is connected).

The voltage regulation circuit 950 functions similar to the voltage regulation circuit 800 illustrated in FIG. 14 and described above. The voltage regulation circuit includes an inductor 958, an input side capacitor 960, a control unit 962, output side capacitors 964, 966, and output side resistors 968, 970. While the input voltage received via the input voltage connection 952 is greater than or equal to a target output voltage to be supplied to a battery powered device via the output voltage connection 954, the control unit 962 can electrically connect the (Vout) terminal with the (Vin) terminal, thereby outputting the input voltage received from the battery to the output voltage connection 954. When the input voltage received via the input voltage connection 952 is less than the target output voltage, the control unit 962 alternately connects the (SW) input terminal with the (GND) output terminal and the (Vout) output terminal, thereby causing a suitable current flow through the inductor 958, which then drives current out through the (Vout) terminal, thereby causing accumulation of charge on the output side capacitors 964, 966, thereby boosting the voltage supplied to the output voltage connection 954 in a manner similar as to described herein with respect to the voltage regulation circuit 800. The input side capacitor 960 serves to reduce variation in the input voltage supplied to the inductor 958 and the control unit 962.

Figure 18:
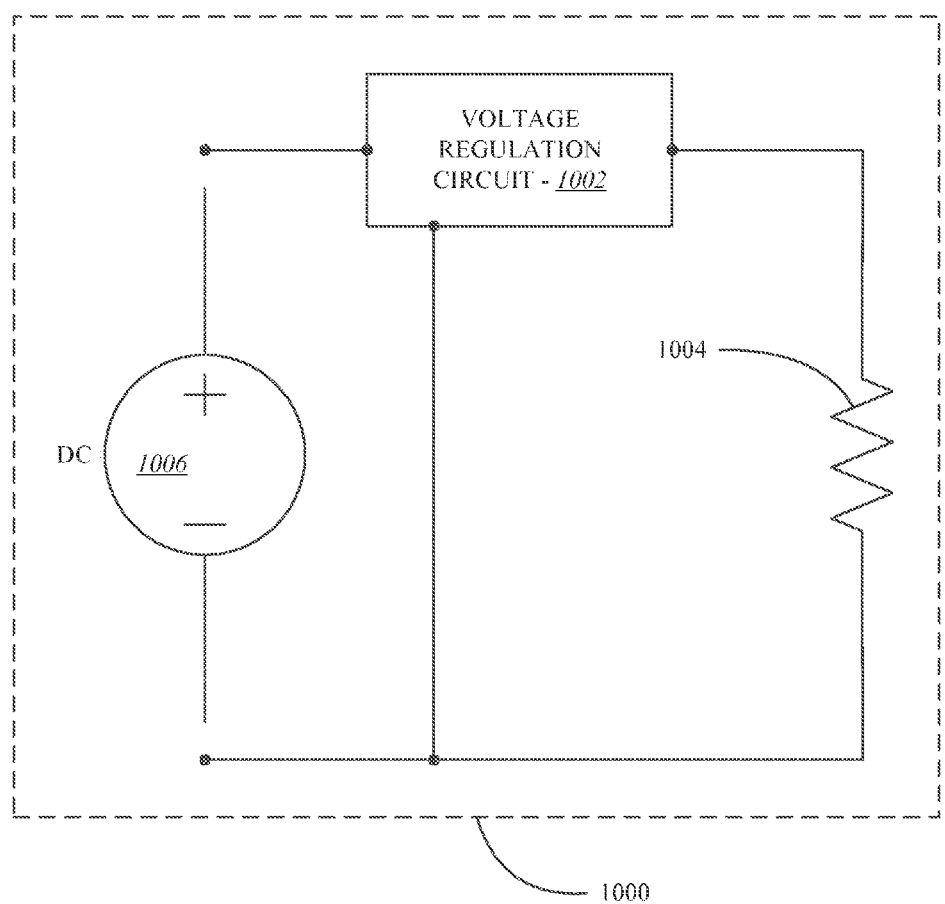
FIG. 18 is a diagram showing an electronic device incorporating a voltage regulation circuit, in accordance with an embodiment.

The voltage regulation circuits can be included within a battery powered device so as to extend the life of one or more batteries used to power the battery-powered device. For example, FIG. 18 shows a battery-powered device 1000 that includes a voltage regulation circuit 1002 included therein. The voltage regulation circuit 1002 can be configured similar to the other regulator circuits described herein. The battery-powered device 1000 includes a circuit and/or element 1004 that is powered by one or more batteries 1004, which can be removable, replaceable, and/or rechargeable. As with the other regulation circuits described herein, the voltage regulation circuit 1002 is configured to extend the life of the one or more batteries 1004 by outputting a regulated voltage for use in powering the circuit and/or element 1004 even when the voltage output by the one or more batteries 1004 falls below a minimum voltage required for normal operation of the circuit and/or element 1004.

Although specific embodiments have been illustrated and described herein, it will be appreciated by those of ordinary skill in the art that any arrangement that is calculated or designed to achieve the same purposes may be substituted for the specific embodiments shown. Many adaptations of the disclosure will be apparent to those of ordinary skill in the art. For example, the configuration and/or functionality described herein with regard to any of the voltage regulator 105, the regulator 405, the regulator 505, the voltage regulator 605, the regulator circuit 705, the regulator circuit 729, the regulator circuit 742, the voltage regulation circuit 800, the step-down converter circuit 850, the voltage regulation circuit 900, the voltage regulation circuit 950, and the functionality described herein, such as the functionality described herein with respect to FIG. 11 through FIG. 13, can be employed alone or in any suitable combination in a method and/or device for extending the life of a battery. Accordingly, this application is intended to cover any adaptations or variations of the disclosure.

What is claimed is:

1. A battery having an extended operating life, the battery comprising:
    an outer shell;
    a voltage generating cell disposed within the outer shell and providing an output voltage on an internal positive terminal and an internal negative terminal;
    an external positive terminal;
    an external negative terminal; and
    a voltage regulation circuit disposed within the outer shell, the voltage regulation circuit receiving the output voltage provided by the one or more voltage generating cells and generating an increased output voltage relative to the voltage provided by the one or more voltage generating cells over at least a portion of an operating life of the one or more voltage generating cells, the voltage regulation circuit being operatively connected to the external positive and negative terminals to output the generated increased output voltage via the external positive and negative terminals, the battery being configured to operate in a bypass phase and a boost phase such that during the bypass phase, the external positive and negative terminals are electrically coupled to the internal positive and negative terminals, and during the boost phase, the battery outputs the increased voltage provided by the voltage regulator circuit on the external positive and negative terminals.

2. The battery of claim 1 wherein when the output voltage provided by the voltage generating cell is greater than a pre-selected voltage, the output voltage provided by the voltage generating cell is provided on the external positive and negative terminals.

3. The battery of claim 2 wherein if the output voltage provided by the voltage generating cell is less than the pre-selected voltage, the increased output voltage is provided on the external positive and negative terminals.

4. The battery of claim 1 wherein the voltage regulation circuit has an input terminal connected to the internal positive terminal, the battery further comprising a bypass transistor coupled between the input terminal and the external positive terminal, wherein:

when the output voltage provided by the voltage generating cell is greater than a pre-selected voltage, the input terminal is electrically coupled to the external positive terminal through the bypass transistor, and when the output voltage provided by the voltage generating cell is less than the pre-selected voltage, the increased output voltage is provided on the external positive and negative terminals.

* * * * *